US005269210A

United States Patent [19]

Johnson

[11] Patent Number: 5,269,210

[45] Date of Patent: Dec. 14, 1993

[54] SLITTER MACHINE FOR USE IN MANUFACTURING SEMICONDUCTOR DEVICES

[75] Inventor: Frank J. Johnson, Santa Cruz, Calif.

[73] Assignee: Amkor Electronics, Inc., West Chester, Pa.

[21] Appl. No.: 763,806

[22] Filed: Sep. 23, 1991

[51] Int. Cl.[5] ........................... B23B 1/00; B26D 1/16

[52] U.S. Cl. ........................................... 82/47; 82/93; 82/100

[58] Field of Search ...................... 82/70.1, 83, 86, 89, 82/91, 92, 93, 100, 48, 80, 81, 94, 98, 99.1, 101, 47; 83/368, 649

[56] References Cited

U.S. PATENT DOCUMENTS

| | | | |
|---|---|---|---|
| 518,030 | 4/1894 | Gay | 82/99.1 X |
| 948,401 | 2/1910 | McGeouch | 82/93 |
| 1,835,398 | 12/1931 | Huston | 82/100 X |
| 1,864,903 | 6/1932 | Gora | 82/100 X |
| 1,892,058 | 12/1932 | Judelshon | 82/100 X |
| 3,218,894 | 11/1965 | Chow | 82/101 |
| 3,522,748 | 8/1970 | Treffner | 82/101 |
| 4,274,315 | 6/1981 | Varner | 82/48 X |
| 4,611,517 | 9/1986 | Schmale | 83/368 X |
| 4,748,880 | 6/1988 | Languillat | 82/100 X |
| 4,748,881 | 6/1988 | Keeling | 82/92 X |
| 4,901,611 | 2/1990 | Bentley | 82/100 |
| 5,025,692 | 6/1991 | Reynolds | 83/649 X |

FOREIGN PATENT DOCUMENTS

| | | | |
|---|---|---|---|
| 3208493 | 9/1982 | Fed. Rep. of Germany | 82/83 |
| 3407854 | 9/1985 | Fed. Rep. of Germany | 82/48 |

*Primary Examiner*—Z. R. Bilinsky

*Attorney, Agent, or Firm*—John F. A. Earley; John F. A. Earley, III

[57] ABSTRACT

A slitter machine for slitting a film sheet wound on a core in a roll to obtain desired widths of film sheet for laminating onto metallic substrates of semiconductor devices comprises a main frame, notches on the main frame for rotatably supporting the roll on the frame, a rotatable knife blade for slitting the roll sheet into a strip of desired width, a tiltable knife blade mounting plate on the frame for mounting the knife blade on the frame, guide tracks adjusting the lateral position of the knife blade to adjust the width of the strip being cut, an air cylinder for pressing the knife blade into the rolled sheet to cut the sheet into strips of the desired width, and a sensing roller for limiting the depth of the cut.

10 Claims, 8 Drawing Sheets

SLITTER MACHINE FOR USE IN MANUFACTURING SEMICONDUCTOR DEVICES

BACKGROUND OF THE INVENTION

This invention relates to slitter machines for slitting a wide film sheet wound on a core in a roll in order to obtain narrower desired widths of the film sheet, and more particularly concerns a slitter machine for slitting desired narrow strips from a wide roll of a tacky film resist sheet having a cover sheet on top and a separator sheet on the bottom, which film resist sheet is to be laminated onto metallic substrates used in semiconductor devices.

Photosensitive film sheets are supplied in a roll which may be five inches to twenty inches wide. However, the strips required for laminating onto metallic substrates may vary between one inch wide to five inches wide, in accordance with the width of the metallic substrate to which it is to be laminated.

But it is not feasible to buy strips which are pre-cut to the desired widths. To do so, the manufacturer of the semiconductor devices would be required to inventory many widths of strips which would be inconvenient and expensive, and would also be required to pay a premium to the supplier of the strips because of the extra steps required to make the strips into the desired widths.

The rolls of photosensitive film sheets referred to are comprised of a tacky layer of photosensitive polymer material, a top protective layer of polyester material, and a bottom separator layer of polyolefin material, although sometimes the separator layer may be omitted. Accordingly, the photosensitive film layer, which is sticky or tacky, is sandwiched between two layers, the cover layer and the separator layer, which protect it. The separator layer is removed before laminating the photosensitive film layer onto the metallic substrates, and the cover layer is removed after the photosensitive film layer is laminated onto the metallic substrates.

However, the cutting or slicing the roll of these composite layers, the tacky photosensitive film layer and its protective top cover and separator bottom cover, poses a number of problems.

It is difficult to slice the composite layers in a precise width and in a true vertical plane.

If a knife blade penetrates too deeply into the roll of overlapping layers, the tacky photosensitive film layer adheres to the sides of the knife blade, which interferes with its ability to cut the composite layers in a clean vertical path. Also, the photosensitive film layer is damaged along its edge, making it difficult or impossible to subsequently laminate the photosensitive film layer onto the metallic substrates.

SUMMARY OF THE INVENTION

It is an object of this invention to solve the problems of the prior art by providing a slitter machine which is adapted to precisely slice or cut a wide roll of a laminated sheet into desired strips of the required widths, and to do so precisely and in a true vertical plane without damaging the edges of the tacky film layer which is in the middle of the composite sheets.

One part of the solution to these problems is to supply a knife blade having a hollow central portion so that its flat cutting edge forms an annular ring, and the central hollow portion does not touch the surface of the tacky film layer.

Another object is to supply a slitter machine which slices wide rolls of composite sheets into the desired strips of thinner width.

Other objects are to provide an air cylinder that supplies pressure to a knife blade to hold it against the roll of composite sheets, to supply a width cut control means which controls and is set to any desired width of strip, to supply depth control means to control the depth of the cut, and to supply means for sensing the center core of the roll before it is contacted by the knife blade, and retracting the knife blade to the outside diameter of the roll.

DETAILED DESCRIPTION OF THE INVENTION

Figure 4:
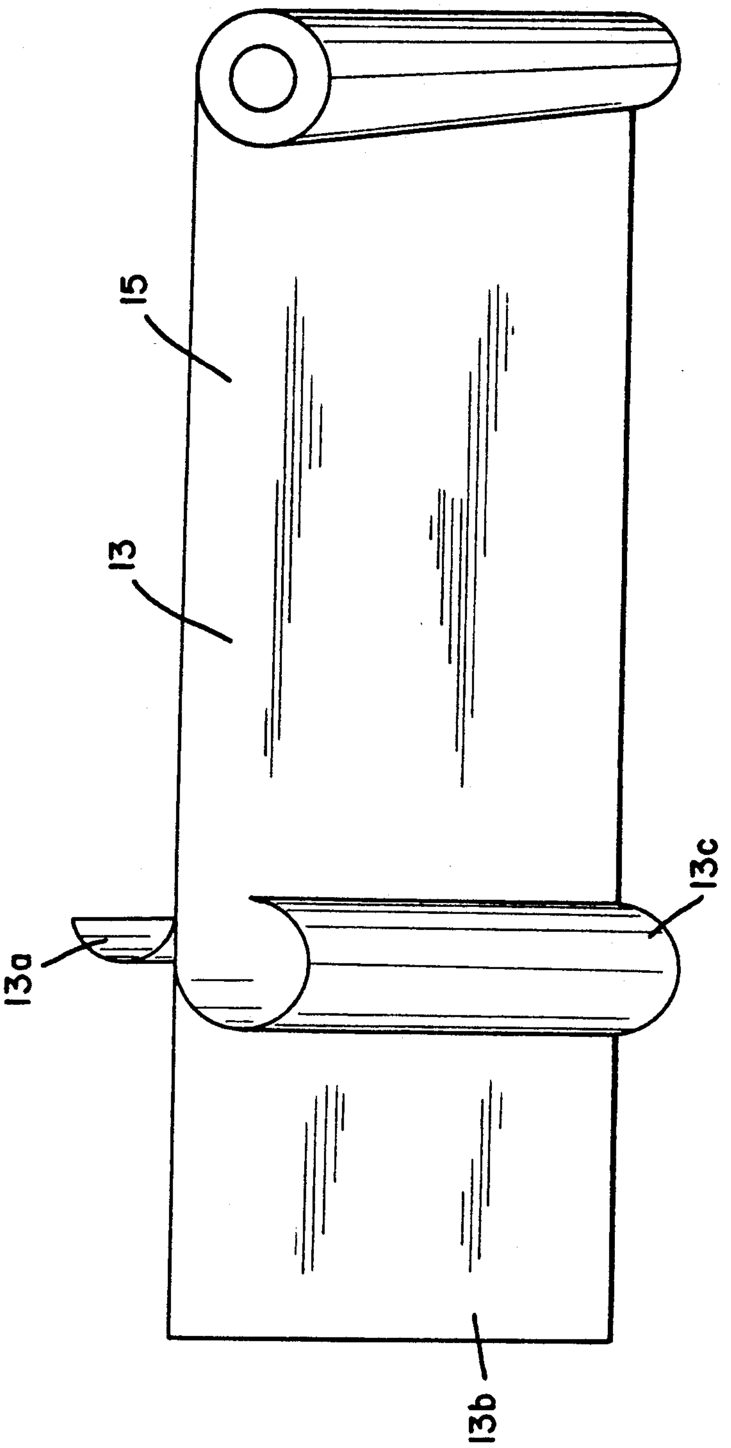
FIG. 4 is a view of the roll showing the photosensitive sheet, the cover sheet and the protector sheet.

Turning now to the drawings, there is shown a slitter machine 11 for slitting a composite film sheet 13 which comprises (FIG. 4) a cover sheet 13*a*, tacky photopolymer film resist sheet 13*b*, and a separator sheet 13*c*. Cover sheet 13*a* is preferably made of a polyester material, and separator sheet 13*c* is preferably made of a polyolefin material which is removed after it has been slit into a strip and prior to laminating the film sheet strip onto metallic substrates of semiconductor devices. The cover sheet 13*a* is removed after the film sheet 13*b* is applied to the metallic substrates, and the film sheet 13*b* is removed from the metallic substrates after the photographic step of the semiconductor device manufacturing operation.

The slitter machine 11 is used to obtain strips 15 of desired width for laminating onto the metallic substrates of semiconductor devices.

Figure 1:
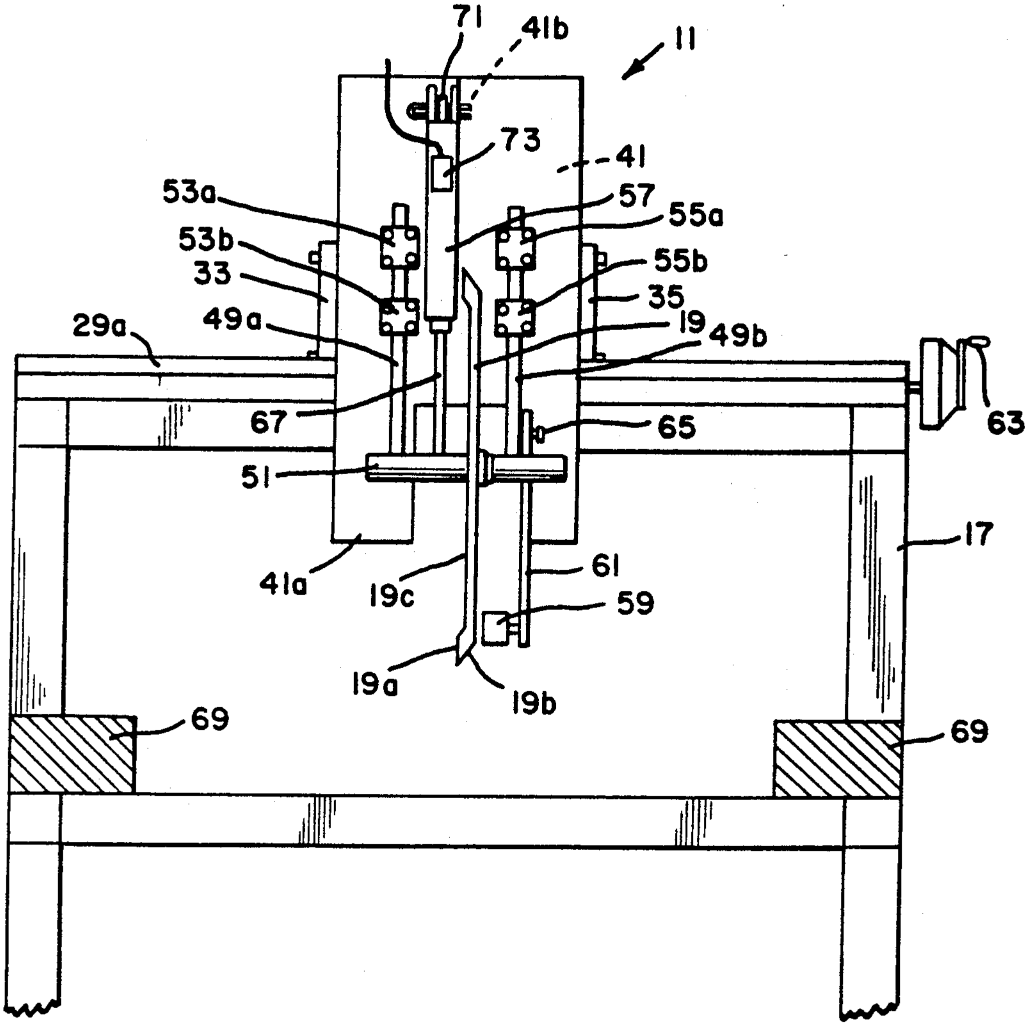
FIG. 1 is a view in front elevation of a slitter machine constructed in accordance with the invention, and shows the preferred form of knife blade.
Figure 1A:
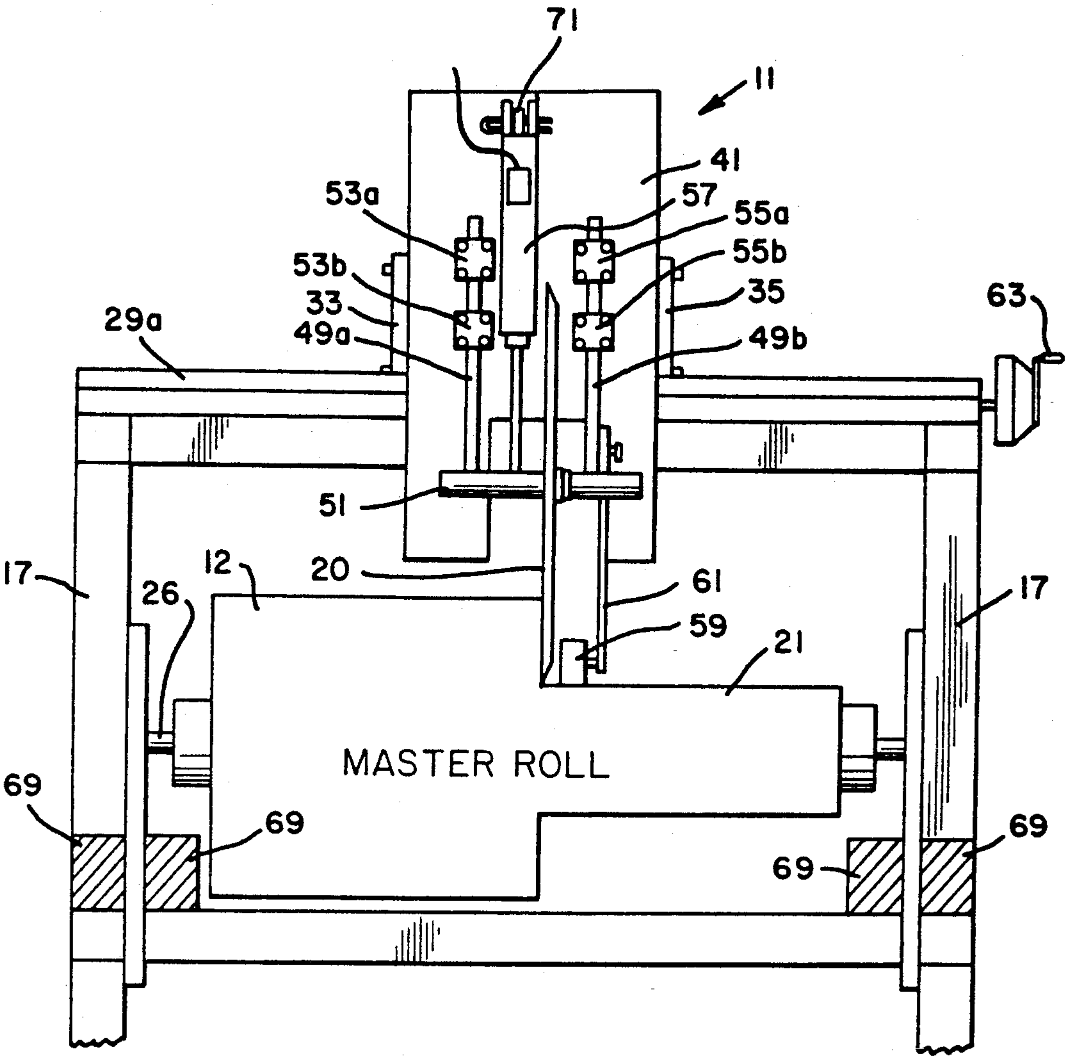
FIG. 1*a* is a view in front elevation of the slitter machine of FIG. 1 with a master roll mounted in the machine, and with an alternative knife blade which is not the preferred form.
Figure 1B:
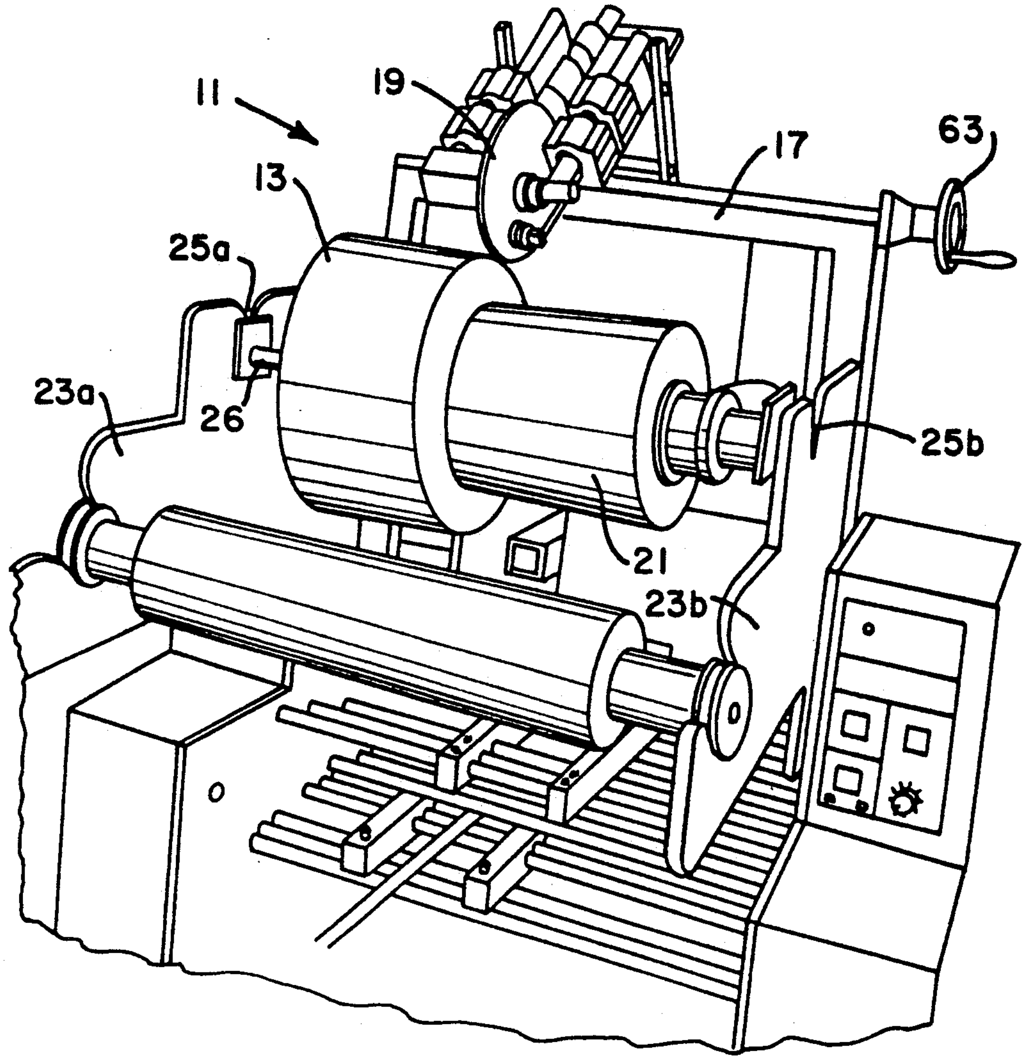
FIG. 1*b* is a view in perspective taken from the front right corner of the slitter machine.
Figure 2:
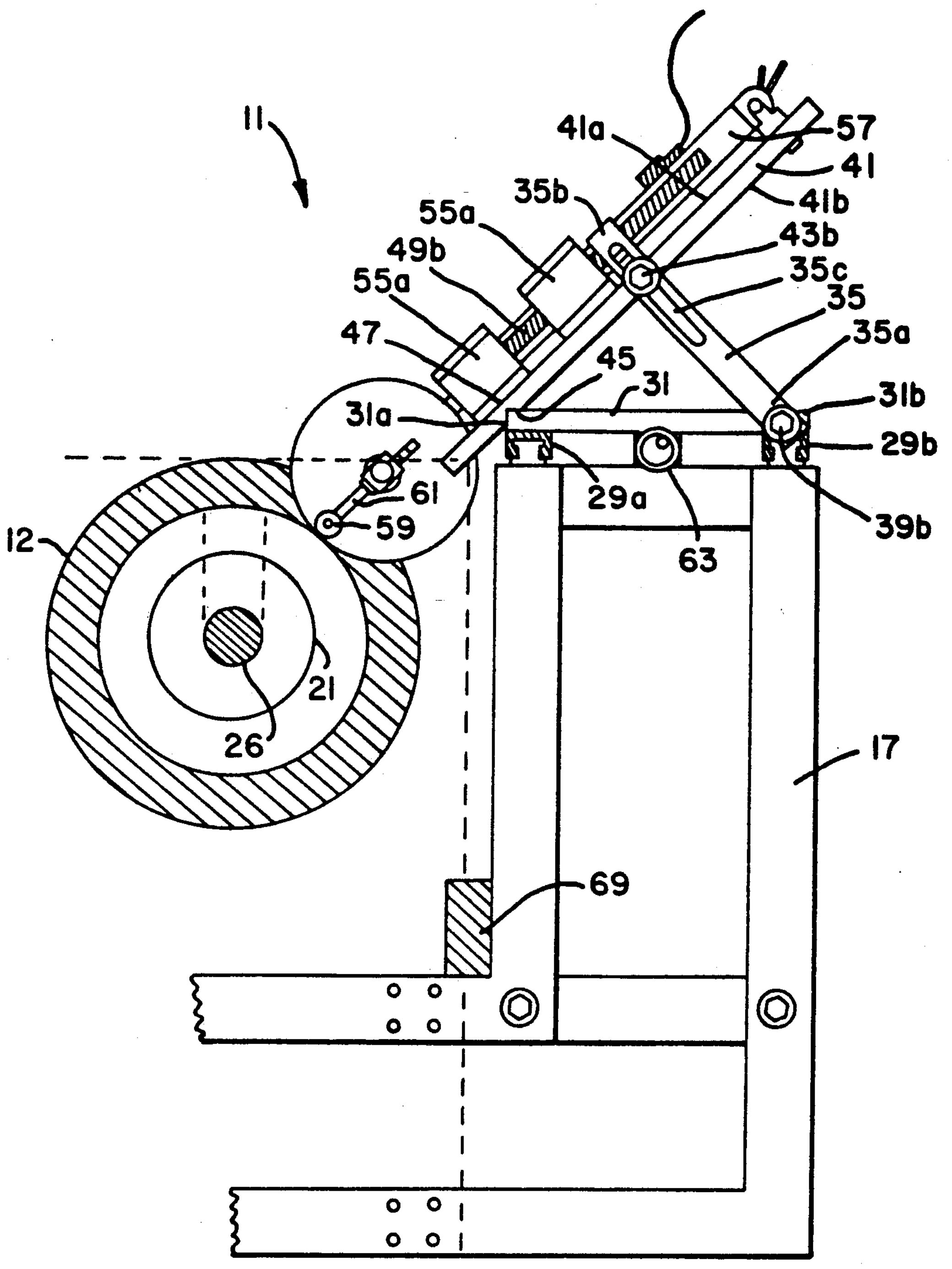
FIG. 2 is a view in side elevation of the slitter machine of FIG. 1*a;*
Figure 2A:
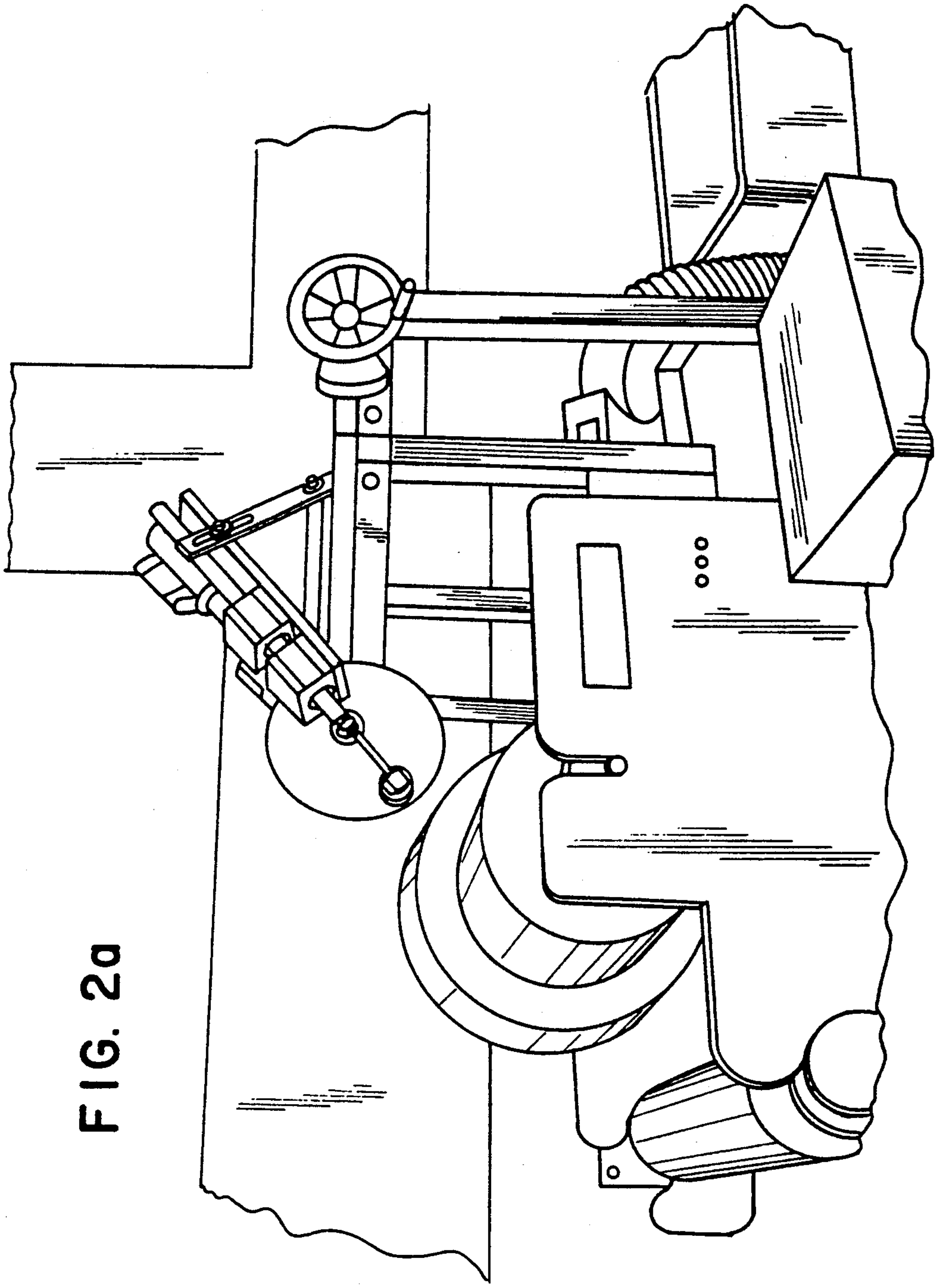
FIG. 2*a* is a view in perspective taken from near the right front corner of the slitter machine.
Figure 2B:
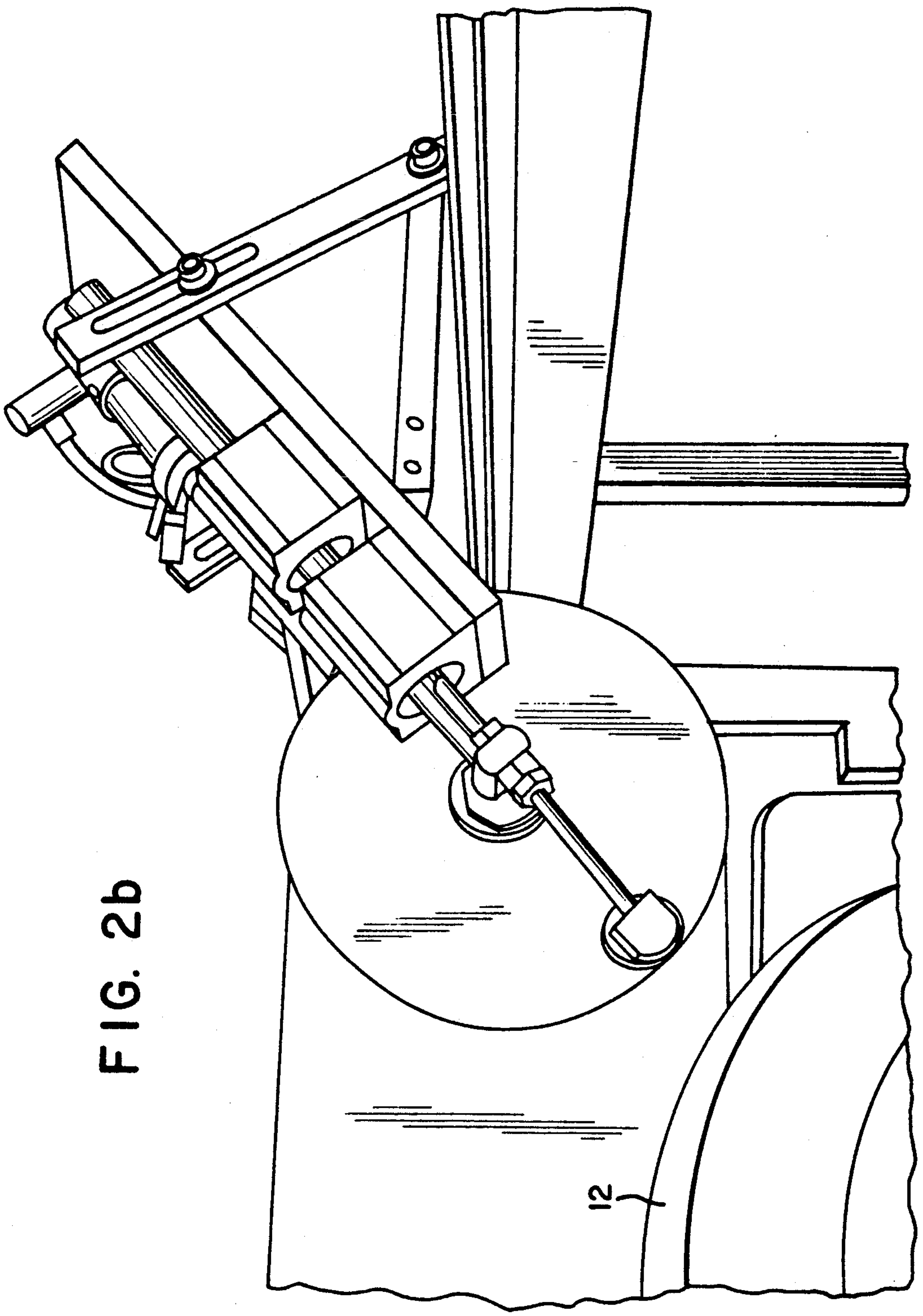
FIG. 2*b* is an enlarged view in side elevation of the knife blade and its mounting mechanism and shows the depth control mechanism that controls the depth of the cut into the roll.
Figure 3:
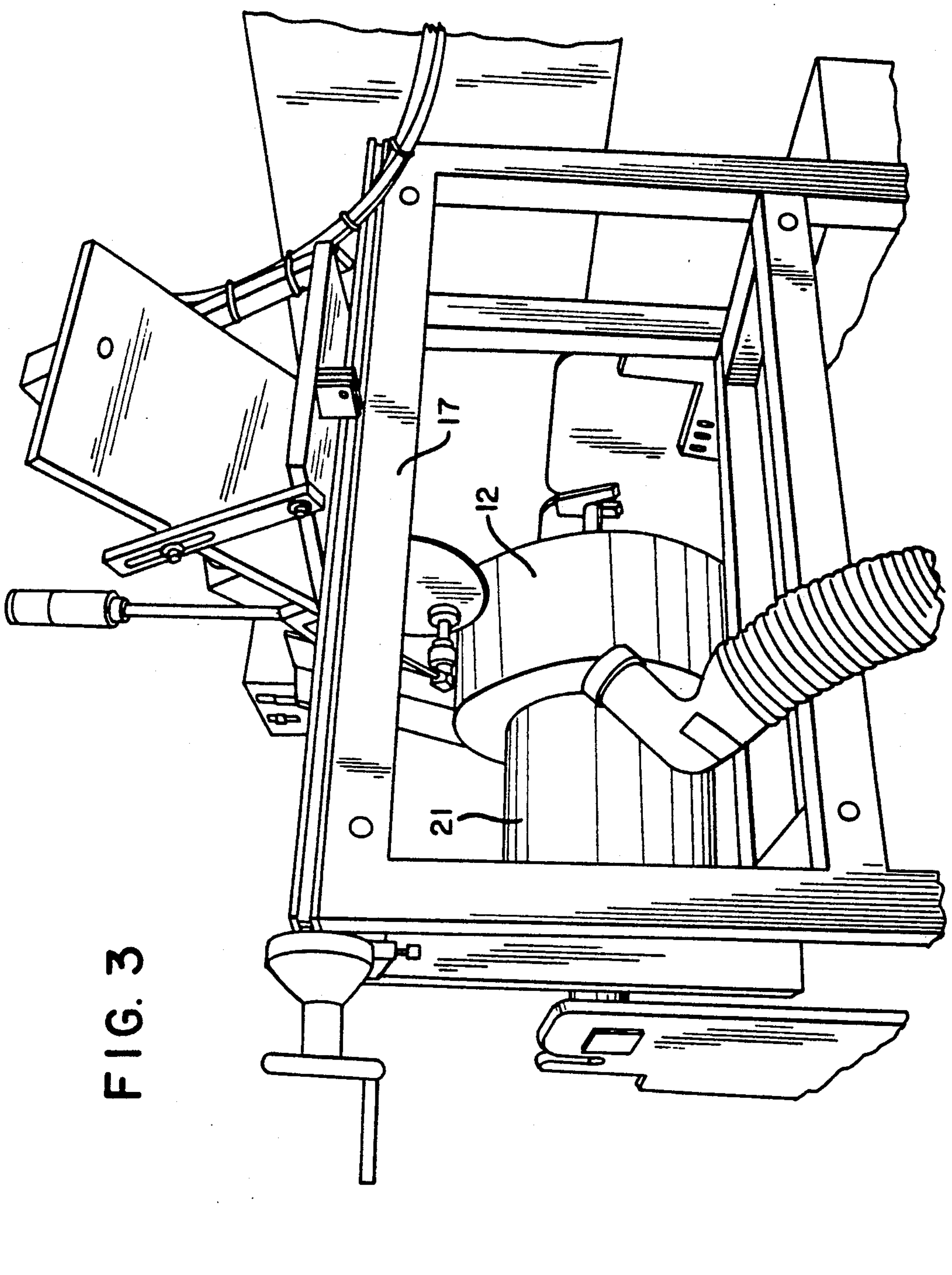
FIG. 3 is a view in perspective taken from about the rear right corner of the slitter machine.

The slitter machine 11 is comprised of a main frame 17, means on the main frame 17 for rotatably supporting the roll 12 on the frame 17, and a rotatable knife blade (19 in FIG. 1 and 20 in FIG. 1*a*) for slitting the roll sheet 13 into strips 15 of desired widths.

Means are provided on the frame 17 for adjusting the lateral position of the knife blade 19 to adjust the width of the strip 15 being cut.

Also, means are provided for pressing the blade 19 into the rolled sheet 13 to cut the sheet 13 into the strips 15, and means are also provided for limiting the depth of the cut.

Further, each roll has a core 21 on which the sheet 13 is wound, and means are provided for sensing the proximity of the core 21 and, when blade 19 has reached a desired distance from core 21, for withdrawing the knife blade 19 to its start position at the outside perimeter of the roll 12.

The means on the main frame 17 for rotatably supporting the roll 12 on the frame 17 comprises frame side walls 23*a*, 23*b*, and notches 25*a*, 25*b* in the side walls 23*a*, 23*b*. Rolls 12 have a shaft 26 within the core 21 with end portions that extend outwardly from the ends of the core 21 and are seated and rotatably supported in the notches 25*a*, 25*b*.

The preferred form of rotatably knife blade 19 (FIG. 1) has a flat cutting edge 19*a*, a tapered edge 19*b* on the other side and a hollow central portion 19*c* in the cutting edge side of the knife blade 19 which lessens the area on the cutting edge side of the knife blade 19 that contacts the edge portions of the roll 12 from which the strip 15 is being cut.

The knife blade mounting means on the frame 17 comprises guide tracks 29*a*, 29*b* which are mounted on the top of the frame 17 and which guide the knife blade mounting means in sidewise movement to position the knife blade 19 at the proper position for cutting a strip 15 of the roll 12 at a desired width.

A bottom plate 31 is mounted on the guide tracks 29*a*, 29*b* and is provided with a front end 31*a* and a rear end 31*b*.

A pair of support arms 33, 35 is provided with each having a rear end portion 33*a*, 35*a* and a front end portion 33*b*, 35*b*. A longitudinal slot 33*c*, 35*c* is formed in the front end portion 33*a*, 35*a* of each of the support arms 33, 35.

A bottom pivot bolt 39*a*, 39*b* is provided for pivotally connecting the rear end portion 33*a*, 35*a* of the support arms 33, 35 to the rear end portion 31*b* of the bottom plate 31.

The support arms 33, 35 are connected to by pivot bolts 43*a*, 43*b* to a tiltable support plate 41. Both pivot bolts 43*a*, 43*b* extend through the slots 33*c*, 35*c* in the support arms 33, 35 and this arrangement permits adjusting of the attitude assumed by the support plate 41.

Support plate 41 has a front surface 41*a* and a rear surface 41*b*, with a notch 45 formed in the rear surface 41*b* near its bottom portion for contacting the front end corner 47 of bottom plate 31 no matter what attitude the support plate 41 assumes.

A pair of blade support rods 49*a*, 49*b* are connected at their bottom end to a transverse shaft 51 on which the knife blade 19 is rotatably mounted. Each blade support rod 49*a*, 49*b* is mounted on support plate 41 in mounting brackets 53*a*, 53*b* and mounting brackets 55*a*, 55*b*. Mounting bracket 53*a* is aligned with mounting bracket 53*b* to hold its rod 49*a* in slidable alignment, and mounting bracket 55*a* is aligned with bracket 55*b* in order to hold its rod 49*b* in slidable alignment, so that blade 19 does not tilt away from the true vertical.

An air cylinder 57 is mounted on tiltable plate 41 and is connected to knife blade transverse shaft 51 to push the knife blade 19 downwardly into contact with the roll 12.

A depth control means is connected to the transfer shaft 51 of the knife blade for contacting and sensing the nearness of the roll 12 and for limiting the depth of the cut, and this depth control means includes sensing roller 59 mounted on a support arm 61 which is adjustably mounted on transverse shaft 51 so that the distance between sensing roller 59 and the center of knife blade 19 may be changed as desired.

Knife blade 19 of the invention is provided with a flat cutting edge 19*a* which faces the master roll 12 and faces away from the strip 15 which is being cut from the master roll 12. The other edge 19*b* of the blade 19 has a taper. The side of the knife blade 19 which faces the master roll has been provided with a hollow central portion 19*c* to lessen the area of contact with the edges of the master roll and with the edges of the tacky polymer film sheet 13*b* which is being cut. The blade 19 is preferably made of carbon steel so that it may be sharpened on occasion.

The blade 19 is rotated by friction from the master roll 12 as it is rotated by pulling the strip 15 from the roll 12 by the operator.

Air cylinder 57 is used to supply pressure and to press the knife blade 19 against the roll 12 to cut the roll and produce the strips 15.

The width of the strip 15 is controlled by a ball groove mechanism which is adapted to move the knife blade 19 laterally to any desired position to slice a strip 15 of whatever width that may be desired. Merely by turning a handle 63, the tiltable support plate 41 is moved sideways along guidetracks 29*a*, 29*b* to a desired position.

To control the depth of the cut, a depth control mechanism is supplied which includes sensing roller 59 that rides on the outer surface of the strip 15 as it is being cut, and controls the depth of the cut through successive layers of the composite film sheet 13. The pressure of the knife blade 19 which is urged downwardly by the air cylinder 57 is offset by the sensing roller 59 in contact with the surface of the strip 15 on the roll.

The position of sensing roller 59 is controlled by a depth control mechanism 65 that includes a fine pitch screw assembly which is set against sensing roller support arm 61 to lock support arm 61 in place.

Shaft 67 of the air cylinder 57 requires a firm guide to insure that side movements of the air cylinder 57 are minimized. To accomplish this, shaft 67 is connected to transverse shaft 51 which has its position controlled by support rods 49*a*, 49*b* that are slidably positioned in mounting brackets 53*a*, 53*b*, 55*a*, 55*b* on tiltable support plate 41.

Main frame 17 is preferably made of metal, and is provided with additional support blocks 69 which absorb any unwanted motion arising from the start up of the machine.

An on-off switch 71 is provided for the air cylinder 57, and may be switched off to remove the pressure on the knife blade 19 if a malfunction should occur, or when a new master roll 12 is being loaded into the machine.

A depth control mechanism 73, a shelf item which is available from XYZ Company, Indian Springs, Calif., and is also available from other companies, activates the withdrawal of the knife blade 19 before the blade 19 touches the center core 21 of the master roll 12. The knife blade 19 automatically is retracted to the periphery of the master roll 12, in position for cutting the next strip 15.

In operation, the operator inserts the roll 12 into the slitter machine 11 manually, and moves the knife blade 19 into proper position above the roll 12. Then the operator turns on a switch 71 which activates the air cylinder 57 and presses the knife blade 19 against the outer periphery of the roll 12.

The operator then attaches an adhesive tape to the cover 13*a* of a strip 15 and pulls the strip 15 off the roll as it is being cut.

The separator sheet 13*c* is removed from the strip 15 and the exposed film sheet 13*b* is pressed by hand onto a metal strip which is to become part of a semiconductor device.

I claim:

1. A slitter machine for slitting a film sheet wound on a core in a roll to obtain desired widths of film sheet for laminating onto metallic substrates of semiconductor devices comprising:

a main frame, means on the main frame for rotatably supporting the roll on the frame in a freely rotatable condition, a single rotatable knife blade for slitting the roll sheet into a strip as the strip is being peeled off the roll, knife blade mounting means on the frame for freely rotatably mounting the knife blade on the frame, means for tiltably advancing the knife blade in the direction of the roll, means for adjusting the lateral position of the knife blade to adjust the width of the strip being cut, means for pressing the knife blade into the rolled sheet as the strip is being pulled from the roll to cut the sheet into a strip, and means for limiting the depth of the cut so that the knife blade does not cut into the core on which the film sheet is wound.

2. The slitter machine of claim 1, further comprising means for sensing the proximity of the core of the roll and for withdrawing the knife blade before it reaches the core and for returning the knife blade to its start position at the outside perimeter of the roll.

3. The slitter machine of claim 1, the means on the main frame for rotatably supporting the roll on the frame comprising:

frame side walls, said roll having a shaft within the core with the shaft having end portions which extend outwardly from the core, and notches in the frame side walls for receiving and rotatably supporting the shaft end portions.

4. The slitter machine of claim 1, wherein said rotatable knife blade has a flat cutting edge on one side of the blade, a tapered edge on the other side of the blade, and a hollow central portion in the cutting edge side of the knife blade to lessen the area on the cutting edge side of the knife blade that contacts the edge portions of the rolled sheet.

5. The slitter machine of claim 1, wherein said knife blade mounting means comprises:

guide tracks mounted on top of the frame for guiding the knife blade mounting means in sidewise movement to position the knife blade at the proper position for cutting a strip of the roll sheet, a bottom plate mounted on the guide tracks and having a front end and a rear end.

a pair of support arms each having a rear end portion and a front end portion with a longitudinal slot in the front end portion, bolt pivot means for pivotally connecting the rear end portion of the support arms to the rear end portion of the bottom plate, a tiltable support plate, bolt pivot means pivotally connecting the support plate to the front end portions of the support arms through the slots in the support arms for adjusting the attitude assumed by the support plate, said support plate having a front surface and a rear surface, a notch in the rear surface of the support plate in its bottom portion for contacting the front end of the bottom plate no matter what attitude the support plate assumes, a pair of blade support rods connected at their bottom portions to a transverse shaft on which the blade is rotatably mounted, mounting means on the support plate for mounting the blade support rods on the support plate and for aligning the rods properly and for permitting slidable movement of the blade support rods so that the blade may be continuously extended to contact the roll to progressively cut the sheet into a strip, said means for limiting the depth of cut including a sensing roller operatively connected to the shaft of the knife blade for contacting the roll and limiting the depth of the cut, and means for pressing said means for limiting the depth of cut, wherein said pressing means is an air cylinder mounted on the support plate and connected to the shaft of the knife blade for continuously pushing the knife blade and the sensing roller of the depth control means.

6. A slitter process for slitting a roll of film sheet wound on a core to obtain strips of film sheet of varied desired widths for laminating onto metallic strips of the same widths of substrates of semiconductor devices, comprising:

freely rotatably supporting a roll of film sheet wound on a core and having a first end and first end edge at one end of the roll and a second end and a second end edge at the other end of the roll, freely rotatably mounting a single rotatably knife blade at a start position means near the roll at a desired distance from the first end edge of the roll, tiltably advancing the knife blade in the direction of the roll, pressing the knife blade into the roll, slitting the roll of film sheet with the knife blade to form a slit and a strip of desired width from the first end of the roll, with said strip having two strip edges with one strip edge being the first end edge of the roll and the other strip edge being an edge of the slit, unwinding the strip from the roll by pulling the strip from the first end of the roll to cause the slitting of the roll, rotating the roll by pulling the strip from the first end of the roll as the strip is being formed by the slitting, simultaneously rotating the knife blade by pulling the strip from the first end of the roll as the strip is being formed by the slitting, and limiting the depth of the slit so that the knife blade does not cut into the core.

7. The process of claim 6, including sensing the proximity of the core of the roll of film sheet, withdrawing the knife blade in the direction away from the core before it reaches the core, and returning the knife blade to its start position near the roll.

8. The process of claim 6, including
providing a slitter machine with a main frame having frame side walls,
providing said roll with a central shaft within the core with the shaft having end portions which extend outwardly form the core,
providing notches in the frame side walls,
receiving the shaft end portions of the roll in the notches,
and rotatably supporting the shaft end portions in the notches.

9. The process of claim 6, including
providing a rotatable knife blade having
a flat cutting edge on one side of the blade,
a tapered edge on the other side of the blade,
and a hollow central portion on the cutting edge side of the knife blade,
the roll film sheet including a tacky polymer film sheet,
slicing the roll with the flat cutting edge of the blade facing the second end of the roll, and
lessening the area on the cutting edge side of the blade that contacts the second end edge of the roll by providing the hollow central portion on the cutting edge side of the knife blade to lessen the area of contact between the blade and the tacky polymer film sheet.

10. A slitter process for slitting a roll of film sheet wound on a core to obtain strips of film sheet of varied desired widths for laminating onto metallic strips of the same widths of substrates of semiconductor devices, comprising:
providing a single rotatable knife blade
providing knife blade mounting means which comprises:
guide tracks (29*a*,29*b*) mounted on top of the frame (17) for guiding the knife blade mounting means in sidewise movement to position the knife blade at the proper position for cutting a strip (15) of the roll (12) sheet at a desired width,
a bottom plate (31) mounted on the guide tracks (29*a*, 29*b*) and having a front end (31*a*) and a rear end (31*b*), a pair of support arms (33, 35) each having a rear end portion (33*a*, 35*a*) and a front end portion (33*b*, 35*b*) with a longitudinal slot (33*c*, 35*c*) in the front end portion (33*a*, 35*a*,),
bolt pivot means (39*a*, 39*b*) for pivotally connecting the rear end portion of (33*a*, 35*a*) of the support arms (33, 35) to the rear end portion (31*b*) of the bottom plate 931),
a tiltable support plate (41),
bolt pivot means (43*a*, 43*b*) pivotally connecting the support plate (41) to the front end portions of the support arm (35) through the slots (35*c*) in the support arm (35) for adjusting the attitude assumed by the support plate (41),
said support plate (41) having a front surface (41*a*) and a rear surface (41*b*),
a notch (45) in the rear surface (41*b*) of the support plate (41) in its bottom portion for contacting the front end (47) of the bottom plate (41) no matter what attitude the support plate (41) assumes,
a pair of blade support rods (49*a*, 49*b*) connected at their bottom portions to a transverse shaft (51) on which the blade (19) is rotatably mounted,
mounting means on the support plate (41) for mounting the blade supports rods (49*a*, 49*b*) on the support plate (41) and for aligning rods (49*a*, 49*b*) properly and for permitting slidable movement of the blade support rods so that the blade may be continuously extended to contact the roll to progressively cut the sheet into a strip of desired width,
means for limiting the depth of cut including a sensing roller (59) operatively connected to the shaft (51) of the knife blade (19) for contacting the roll (12) and limiting the depth of the cut, and
means for pressing said means for limiting the depth of the cut,
wherein said pressing means is an air cylinder (57) mounted on the support plate (41) and connected to the shaft (51) of the knife blade (19) for continuously pushing the knife blade (19) and the sensor roller (59) of the depth control means,
rotatably mounting the blade (19) onto transverse shaft (51),
guiding the knife blade (19) in sidewise movement to position the knife blade (19) at the proper position for cutting a strip (15) of the roll (12) at a desired width to match the width of a metallic strip of substrates of semiconductor devices,
tilting the support plate (41) and adjusting its attitude so that the blade contacts the roll,
contacting the front end (47) of bottom plate (31) with notch (45) in the rear surface (41*b*) of the support plate (41) no matter what attitude the support plate (41) assumes,
aligning the rods (49*a*, 49*b*) properly and permitting slidable movement of the blade support rods (49*a*, 49*b*) so that the blade (19) is continuously extended to contact the roll to progressively cut the sheet into a strip of desired width,
freely rotatably supporting a roll of film sheet wound on a core, said roll having a first end and first end edge at one end of the roll and a second end and a second end edge at the other end of the roll,
freely rotatably mounting the single rotatable knife blade at a start position near the roll at a desired distance from the first end edge of the roll,
tiltably advancing the knife blade in the direction of the roll,
pressing the knife blade into the roll,
slitting the roll of film sheet with the knife blade to form a slit and a strip of desired width from the first end of the roll, with said strip having two strip edges with one strip edge being the first end edge of the roll and the other strip edge being the other edge of the slit,
unwinding the strip from the roll by pulling the strip from the first end of the roll,
rotating the roll by pulling the strip from the first end of the roll as the strip is being formed by the slitting,
simultaneously rotating the knife blade by pulling the strip from the first end of the roll as the strip is being formed by the slitting,
and limiting the depth of the slit so that the knife blade does not cut into the core.

* * * * *